Dec. 10, 1929.  C. W. A. KOELKEBECK  1,739,076
LUBRICATING DEVICE
Filed Feb. 23, 1924    2 Sheets-Sheet 1
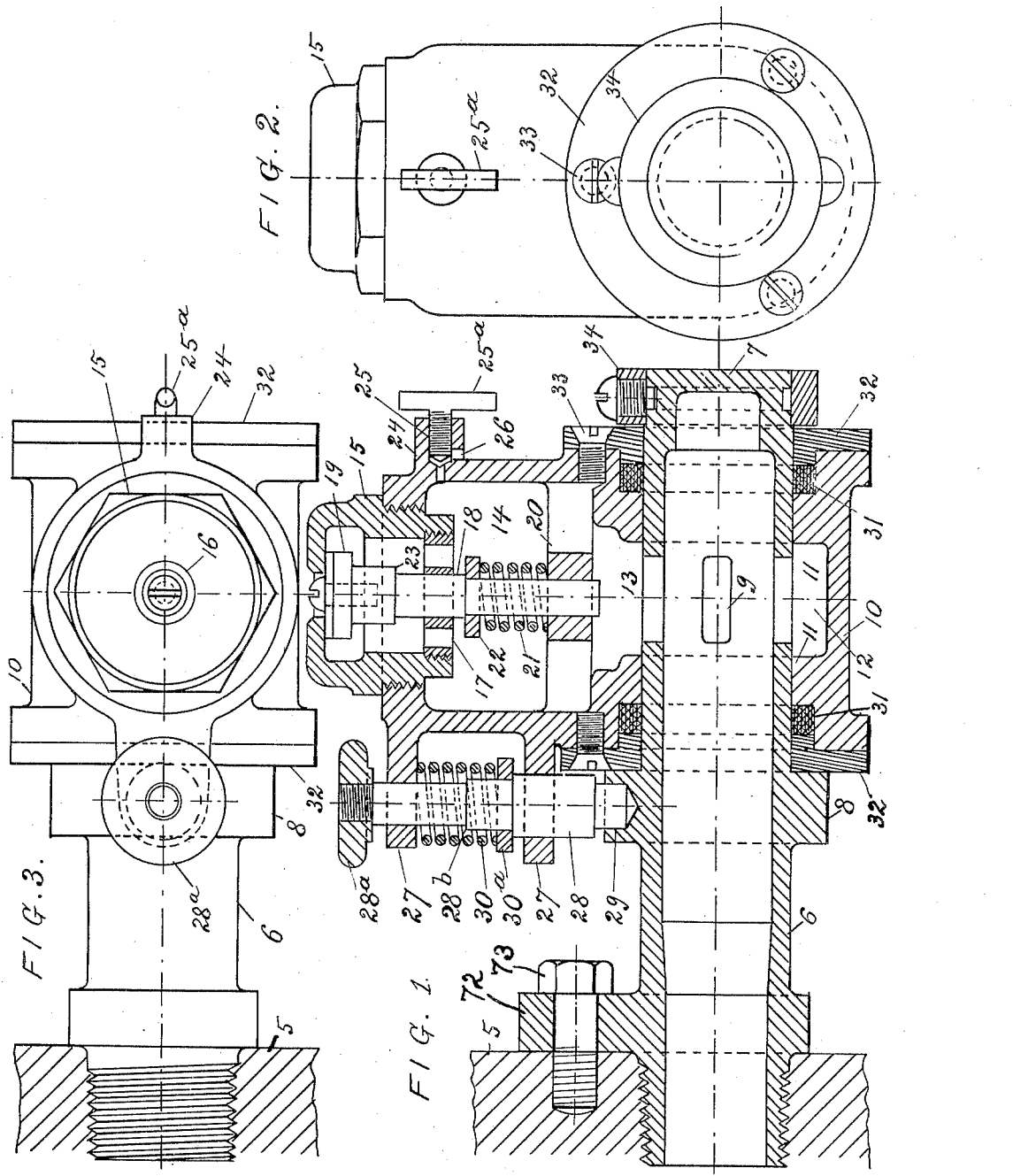
INVENTOR:
Carl W. A. Koelkebeck
by W. B. Doolittle
ATTORNEY.

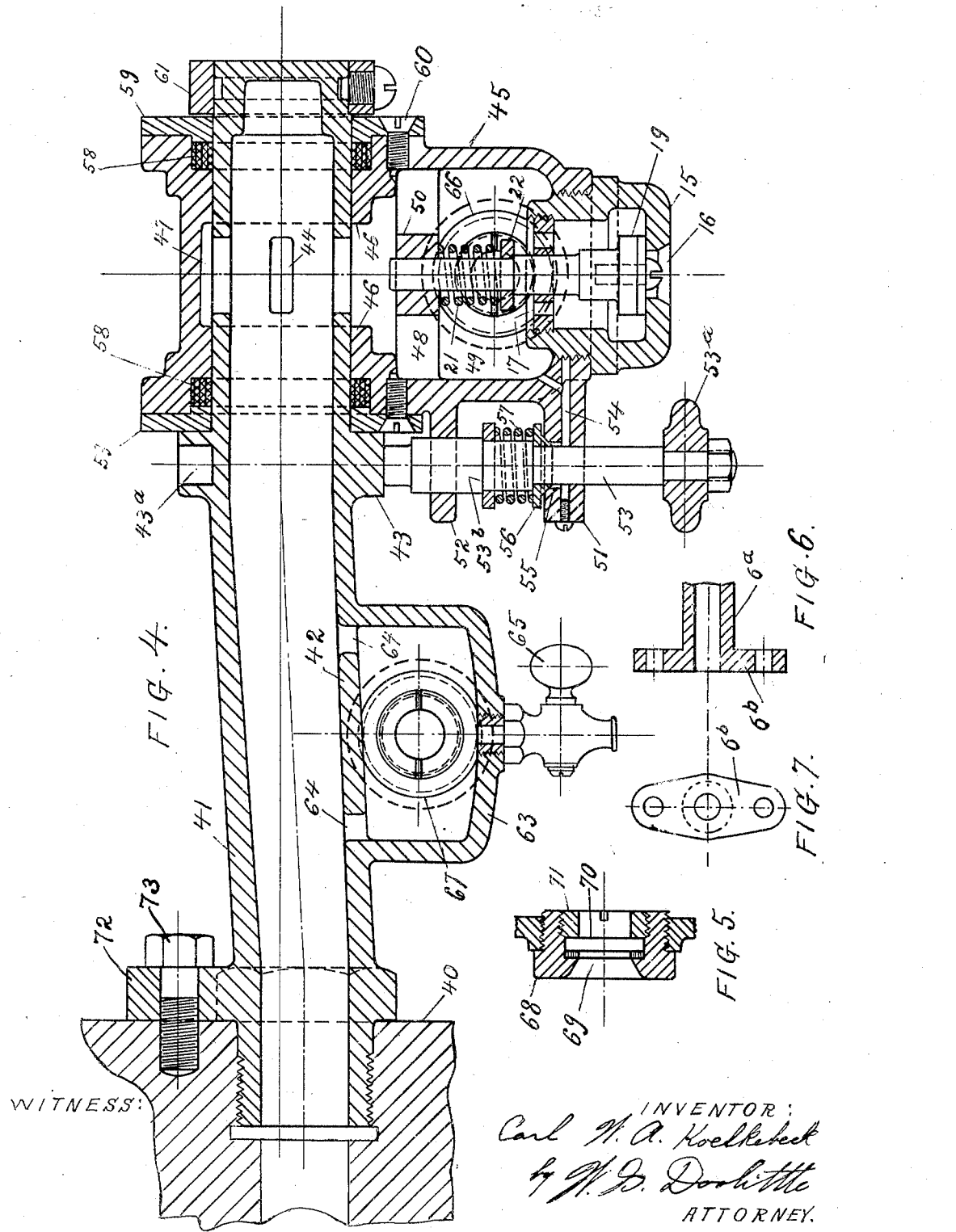

Patented Dec. 10, 1929

1,739,076

UNITED STATES PATENT OFFICE

CARL W. A. KOELKEBECK, OF PITTSBURGH, PENNSYLVANIA

LUBRICATING DEVICE

Application filed February 23, 1924. Serial No. 694,509.

The present invention is for a lubricating device or oil cup for supplying lubricant to a journal or other part to be oiled.

During the time that a machine or mechanical device moving in a bearing is operating, it should generally be well lubricated. However, when the device is stopped, as when it is closed down for the night, the supply of lubricant should be shut off. Heretofore, the lubricant that is in the journal has been allowed to remain in the journal when the machine is idle, and from thence it may escape and waste.

The present invention has for its principal object to provide a lubricant reservoir rotatably mounted with respect to the part to which it supplies lubricant, and so arranged that, when it is in an upright position, it will feed oil to the bearing, but when rotated to inverted position, will receive lubricant from the part supplied, thereby draining off the excess oil and saving it to be fed back to the part supplied when lubricant is again needed.

A further object of the invention is to provide, in a device of this kind, a settling device by means of which impurities flowing with the lubricant from the part being drained back into the reservoir may be trapped and withdrawn.

These and other objects and advantages are attained by my invention, which is illustrated in the accompanying drawings, in which:

Fig. 1 is a longitudinal section through a lubricating device embodying my invention;

Fig. 2 is an end view thereof;

Fig. 3 is a top view thereof;

Fig. 4 is a longitudinal section through a modified form of the invention, including the settling chamber, for removing solid particles from the lubricant;

Fig. 5 is a detail view of a window construction which may be used in the lubricator; and Figs. 6 and 7 are detail views of a modified form of connection.

Referring first to Figs. 1 to 3 of the drawings, 5 designates, conventionally, a bearing or other structure to which lubricant is to be supplied. Screwed or fitted into a suitable opening in the structure 5 is tube or barrel 6, having its outer end closed at 7, and having an annular abutment formed on the exterior thereof, at 8, this abutment being intermediate the ends of the tube. In the barrel, between the abutment and the outer closed end of the tube, are a plurality of ports 9.

Rotatably mounted on the barrel, and closely fitted thereto, is the body 10 of the lubricant receptacle or reservoir. This body has parts 11 that fit on the tube at each side of ports 9, and provide the bearing surface for the rotatable receptacle. Interposed between the parts 11, and surrounding the ports, is a channel 12 formed in the body 10. This channel opens at 13 into the cup or oil receiving chamber 14 of the reservoir.

In the top of the reservoir is a threaded opening into which is screwed valved filling cap 15, in the top of which is an aperture 16. Guided in a perforated bushing 17, screwed into the interior of the cap, is a rod or valve stem 18, on the upper end of which is a valve member 19 adapted to close aperture 16.

The valve stem projects well down into chamber 14 and is slidably guided in a spider 20 in the reservoir. A compression spring 21 confined between spider 20 and washer 22 on the stem, serves to yieldably hold the valve 19 closed. A shoulder 23 on the valve stem limits the inward movement of the valve.

As thus assembled, the valve 19 and its associated parts may be readily removed by unscrewing cap 15. This may be done, for instance, when it is desired to clean the reservoir.

Projecting laterally from one side of the reservoir, near the top thereof, is an integral stud 24 into which is threaded an air valve 25, this valve controlling passage 26 through which air is admitted to the reservoir. The air valve has a handle 25ᵃ by means of which it can be easily turned.

Projecting from the side of the receptacle are spaced apart lugs 27, in which is slidably guided a locking pin 28 whose inner end is adapted to project into recess 29 in abutment 8, to hold the lubricator in upright position. This pin, provided at its upper end with a suitable removable knob 28ª, is resiliently urged downwardly by a compression spring 30 surrounding the pin and confined between the lower surface of the upper lug 27 and a washer 30ª on the pin. A shoulder 28ᵇ on the pin limits the outward movement of the pin by engagement with the under surface of the outermost lug 27.

Outside of parts 11 of the body 10, are annular recesses, each of the said recesses is adapted to receive a packing material designated 31. This packing is confined in place by gland-plates 32 secured to the body 10 by a plurality of screws 33. A removable collar 34 retains the body 10 in place, the body being confined by collar 34 and abutment 8.

In use, oil is supplied to the reservoir by depressing valve 19 with the filling spout of a can or funnel, enabling oil to be poured into the reservoir. So long as the reservoir is kept in the position shown in Fig. 1, it will feed oil to the part to be lubricated through ports 9 and tube 6, the flow of oil being regulated by air valve 25.

When it is no longer desired to supply lubricant, as when the machine or device to which the lubricator is applied is shut down, air valve 25 is closed, locking pin 28 lifted, and the body 10 rotated on barrel 6 to inverted position. The excess lubricant in the bearing and the barrel may then drain back into the reservoir, through ports 9, thus saving lubricant that otherwise might waste. Upon starting the device to which the lubricant is supplied, body 10 is rotated a half turn back to upright position, and the air valve again opened.

In Fig. 4, a generally similar device is illustrated. In this form, 40 indicates the machine or device on which the lubricator is mounted. Into this is screwed a barrel or tube 41 which has an intermediate portion between its inner and outer ends inclined upwardly from the horizontal, as indicated at 42. On the tube, beyond the inclined part, is an annular abutment 43 and in the tube, between the abutment and the outer end of the tube, which is closed, is an annular series of ports 44. Surrounding the ported area of the tube is the body 45 of the oil receptacle, which body has portions 46 thereon at each side of the ports that fit on the tube, and provide the bearing surfaces of the body. Between these portions is a channel 47 that surrounds the ports. The channel opens through passage 48 into the oil reservoir or chamber 49. This chamber has a threaded opening in its top, in which is the filling valve previously described, and to which reference numerals corresponding to those indicating the same parts in Fig. 1 have been applied. The spider for guiding the inner end of the valve stem is indicated at 50. It may be stated that, in Fig. 4, the receptacle is shown in the inverted position.

Projecting out from the body 45 are two lugs 51 and 52. Guided in these lugs 51 and 52 is a locking pin 53 having a knob 53ª at its outer end. The inner end of the pin is adapted to bear against the annular abutment 43, and to be projected into recess 43ª therein, when the reservoir is in its upright position, to releasably hold the body 45 against rotation.

The outer lug 51 has an air passage 54 therethrough that communicates with the interior of the reservoir. The passage communicates with the atmosphere around the locking pin on the inner face thereof, a passage 55 being formed around the pin, the pin at other points being closely fitted in the guide opening in the lug. Slidable on the stem is a valve member 56 that is adapted to close the air passage 55 around the stem of the locking pin. Confined between shoulder 53ᵇ on the pin and the valve member 56 is a compression spring 57 that embraces the pin. The tension of this spring is such that, when the body 45 is inverted, the end of the locking pin bearing on the abutment 43, the spring will hold the air valve closed. When the body is rotated to upright position, this spring urges the pin into recess 43ª, but as soon as the inner end of the pin is projected into recess 43ª, pressure will be removed from valve 56, allowing it to drop by gravity a slight extent, and thus admit air to the reservoir. This arrangement removes any necessity for manual operation of an air valve, as required by the structure shown in Fig. 1.

At 58 are grooves to receive packing, and 59 are plates similar to plates 32 held in place by screws 60. At 61 is a removable collar for holding the reservoir in place on the body.

In the bottom of the inclined part 42 of the tube 41 is a settling chamber or sump 63, which communicates with the interior of the tube through ports 64. In the bottom of this sump is a drain cock 65.

When oil flowing from the part being lubricated back into the reservoir flows into the inclined part of the tube, its rate of flow is checked and the solid particles which it holds in suspension are precipitated and settle into the sump, which thus provides a trap, and the cleaner oil flows on back into the reservoir. The trap may be drained from time to time.

I have illustrated a window 66 in the oil reservoir and a similar window 67 in the trap. These windows may be of any suitable construction, one form being shown in Fig. 5, wherein 68 indicates a plug screwed into the wall of the chamber, and in which is a rebated central aperture. At 69 is a gasket, 70 is glass, and 71 a screwed-in retaining ring.

In both the forms shown in Figs. 1 and 4, an extension 72 may be provided on the tube through which a bolt as bolt 73 in Fig. 4, may pass, such bolt engaging the machine on which the lubricator is attached to hold the discharge tube against rotation when the reservoir of the respective devices is being turned.

Instead of providing a thread at the end of the discharge, the discharge tube may, as shown in Figs. 6 and 7 where it is indicated as 6ª, be provided with a flanged end 6ᵇ, by means of which it may be bolted to the structure to be provided with lubricant. Figs. 6 and 7 show sectional and end views, respectively.

Various changes and modifications may be made in the construction of the device within the contemplation of my invention and within the scope of the appended claims.

What I claim is:

1. A lubricator comprising a discharge tube, a reservoir rotatably mounted thereon and revoluble thereon from upright to inverted position to cut off the supply of lubricant from the reservoir to the discharge tube, said reservoir communicating with said tube in either position, and a self-closing filling valve on the reservoir for preventing escape of lubricant when the reservoir is inverted.

2. A lubricator comprising a discharge tube, a reservoir rotatably mounted thereon movable from an upright to an inverted position, said reservoir communicating with said tube in either position, an air inlet for the reservoir, and a self-closing filling valve on the reservoir.

3. A lubricator comprising a discharge tube, a reservoir rotatably mounted thereon and movable from an upright to an inverted position, said reservoir communicating with said tube in either position, an air inlet valve for the reservoir, a self-closing filling valve on the reservoir, and means for closing said air valve and maintaining it closed when the reservoir is in any other than an upright position.

4. A lubricator comprising a discharge tube, a reservoir revolubly mounted on the tube and uninterruptedly communicating with the interior of the tube, said reservoir being revoluble from an upright to an inverted position, a controlled air inlet for the reservoir, and means for releasably holding the reservoir in an upright position.

5. A lubricator comprising a discharge tube, a reservoir rotatably carried thereby and movable from an upright to an inverted position, said reservoir communicating with the discharge tube in either position, and a reciprocable locking pin for releasably holding the reservoir in an upright position.

6. A lubricator comprising a discharge tube, a reservoir rotatably mounted on said tube and movable thereon from an oil feeding position to a reverse position, and an oil trap carried by an in open communication with the said discharge tube and spaced from the reservoir for collecting solid particles in the oil.

7. A lubricator comprising a discharge tube, a reservoir communicating with the tube and movable thereon from an oil feeding position to a reverse position thereon, and an oil trap carried by and in open communication with the said discharge tube, said trap being spaced from the reservoir and arranged to collect foreign particles when the oil is flowing through the tube toward the reservoir.

8. A lubricating device comprising a discharge tube, a reservoir communicating with one end of the tube, the discharge opening being at the other end of the tube, said reservoir being movable from an upper feeding position to a lower receiving position, and means in the tube for retarding the flow of lubricant through the tube from the discharge end to the reservoir when it is in receiving position, and means carried by the tube and in open communication therewith for receiving particles precipitated from the oil when thus retarded.

9. A lubricating device comprising a discharge tube, a reservoir revoluble about one end of the discharge tube, a settling basin in the discharge tube disposed between the reservoir and the opposite end of the tube, and a drain for said basin., In testimony whereof I affix my signature.

CARL W. A. KOELKEBECK.